US005138935A

United States Patent [19]

Granbom

[11] Patent Number: 5,138,935

[45] Date of Patent: Aug. 18, 1992

[54] ARRANGEMENT FOR ATTACHING A RAIL TO A PISTON-CYLINDER TYPE CONTROL DEVICE

[75] Inventor: Bo Granbom, Kungsör, Sweden

[73] Assignee: Hygrama AG, Switzerland

[21] Appl. No.: 651,446

[22] Filed: Feb. 6, 1991

[30] Foreign Application Priority Data

Feb. 9, 1990 [SE] Sweden ............................ 9000479-7

[51] Int. Cl.$^5$ ............................................. F01B 29/00

[52] U.S. Cl. .......................................... 92/88; 92/161; 277/DIG. 7

[58] Field of Search ............... 92/88, 165 R, 161, 146; 277/DIG. 7

[56] References Cited

U.S. PATENT DOCUMENTS

| | | | |
|---|---|---|---|
| 4,519,297 | 5/1985 | Lipinski | 92/88 |
| 4,685,383 | 8/1987 | Ruchser | 92/88 |
| 4,852,465 | 8/1989 | Rosengren | 92/88 |
| 4,856,415 | 8/1989 | Noda | 92/88 |
| 4,926,982 | 5/1990 | Granbom | 92/88 |
| 4,960,037 | 10/1990 | Granbom | 92/88 |

FOREIGN PATENT DOCUMENTS

| | | | |
|---|---|---|---|
| 0068088 | 1/1983 | European Pat. Off. | 92/88 |
| 0104364 | 4/1984 | European Pat. Off. | 92/88 |
| 0294350 | 12/1988 | European Pat. Off. . | |
| 3124878 | 12/1982 | Fed. Rep. of Germany | 92/88 |

*Primary Examiner*—Thomas E. Denion
*Attorney, Agent, or Firm*—Michael, Best & Friedrich

[57] ABSTRACT

An attachment arrangement for attaching an object (4), for instance a rail, such as a support rail, brake rail, mounting rail or the like, onto a piston-cylinder control device (1), the cylinder of which has two undercut grooves (3) extending along at least one of its sides, these grooves being parallel with one another and therewith also with the cylinder axis. The object (4) is provided with two parallel ridges or keys (5), each of which is intended for locking coaction with a respective undercut groove (3). At least one wedge-shaped, elongated device (6) is arranged between the outside of the cylinder (1) and the object (4), in connection with each pair of coacting grooves (3) and ridges (4). Means (9) are provided for moving the wedge-shaped devices (6) in a direction transversely to the cylinder axis, so that these devices (6), in engagement with oblique surfaces (7) on the cylinder (1) and/or the rail (4), will fixate the rail in a position parallel with the cylinder axis.

18 Claims, 2 Drawing Sheets

ARRANGEMENT FOR ATTACHING A RAIL TO A PISTON-CYLINDER TYPE CONTROL DEVICE

BACKGROUND OF THE INVENTION

The present invention relates to an arrangement for attaching a rail to a piston-cylinder control device, for instance an "Origa"-type piston-cylinder device, comprising a cylinder which is provided with two undercut grooves along at least one of its sides, said grooves extending parallel with one another and thus also with the cylinder axis. This rail may form a support rail, a brake rail for retardation of the piston movable in the cylinder, a mounting rail, a rail for steering a toothed belt which is used many times for controlling piston movement, and like rails.

It is known, for instance from European Patent Specification No. EP-A-0294350, to attach a rail to a piston-cylinder device of the aforesaid kind. In this case, the attachment is effected with the aid of two strips on one side provided with pronounced ridges which engage in corresponding grooves. The rail positioned adjacent the piston-cylinder device is secured to said device, by screwing the strips against one another.

Cylinders of the aforedescribed kind are produced by press extrustion, as are also the aforesaid strips. It is not possible to achieve great precision by extrusion, and the configuration and position of the grooves and the ridges along the cylinder and along the strips respectively will vary. The guide rail, which is discussed in the aforesaid European Patent Application No. EP-A-0294350, is often found to be warped subsequent to extrusion. Consequently, in the aforesaid examples, it is not possible to achieve precise parallelity and that a slide moving along the guide rail will "wobble" as a result thereof.

SUMMARY OF THE INVENTION

The object of the present invention is to alleviate the aforesaid deficiencies when fitting a rail to the cylinder of a piston-cylinder device of the aforedescribed kind.

BRIEF DESCRIPTION OF THE DRAWINGS

The invention will now be described in more detail with reference to some exemplifying embodiments thereof illustrated in the accompanying drawings, in which.

DETAILED DESCRIPTION

Figure 1:
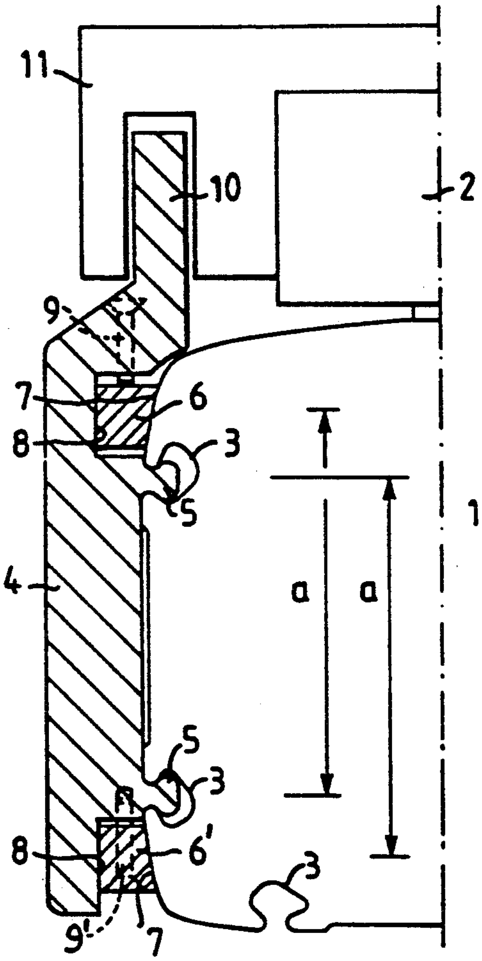
FIG. 1 is a schematic partial section of a cylinder fitted with a brake rail.

The Figures illustrate very schematically a section through a cylinder 1, wherein only half said section is shown in FIG. 1. The piston-cylinder device is a pneumatically operated device and the piston is provided with a dogging element 2 which extends laterally through a slot provided in the cylinder wall, said slot being sealed by means of a sealing band. This type of rodless piston-cylinder device is well known to the art and will not therefore be described in detail here. As will be seen from the Figures, each of three sides of the cylinder 1 is provided respectively with two undercut grooves 3 which extend parallel with one another and therewith also with the cylinder axis.

In FIG. 1, there is shown a support rail 4 provided with two ridges 5 which extend parallel with one another along the rail. The ridges 5 are profiled in a manner such as to engage beneath the undercut of the grooves 3 when fitting the rail, which is achieved by pushing the rail from one end along the cylinder. The length of the rail corresponds to the length of the piston and therewith the length of stroke of the dogging element 2. The device also includes elongated strips or 6' which have a wedge-shaped cross-section and the oblique surfaces of which rest against the bevelled mantle surface of the cylinder 1 and the opposing straight surfaces of which abut a surface 8 of a recessed part of the support rail 4. FIG. 1 illustrates two different examples of moving the wedge-shaped strips 6 or 6' into locking engagement. In the upper part of the Figure, there is shown a screw 9 which is screwed into the support rail and by means of which the upper wedge-shaped strip 6 can be urged towards the other wedge-shaped strip 6'. Another possibility is to displace the wedge-shaped strip 6' shown at the bottom of the Figure. In this case, the wedge-shaped strip 6' is provided with a through-passing hole through which screws 9' (only one is shown) extend and screw into the support rail, thereby enabling the wedge-shaped strip 6' to be drawn in towards the other wedge-shaped strip 6, by means of the screws. It will be understood that a number of screws 9 are disposed along the length extension of the wedge-shaped strips, so as to uniformly distribute the clamping forces. This also applies to the embodiments illustrated in FIGS. 2, 3 and 4.

By thus urging the wedge-shaped strips 6 or 6' towards one another, the support rail will be urged outwards, as a result of the wedging action, and be "suspended" from the ridges 5 engaging the grooves 3. The support rail 4 is therewith clamped with the aid of well-defined and relatively wide abutment surfaces 8 and 7, thereby aligning the support rail 4 precisely with the cylinder axis. It will be understood that the material at the edges of the grooves 3, and also the material of the ridges 5, will be deformed elastically when the support rail is clamped firmly to the piston-cylinder device.

The illustrated support rail 4, is intended to support the dogging element 2 when said element is subjected to load transversely of the cylinder axis, to which end the dogging element 2 is provided with a runner 11 which grips around a support flange 10 on the rail 4.

Figure 2:
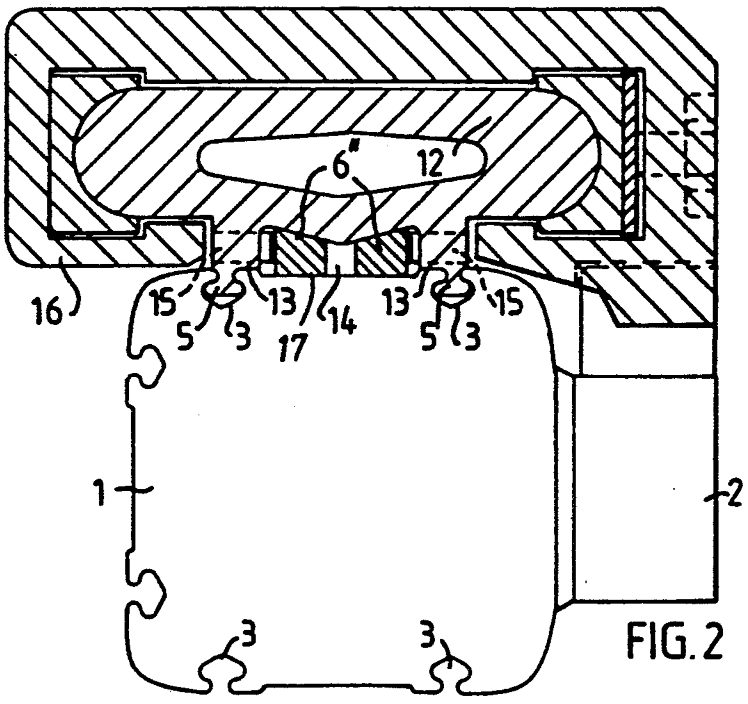
FIG. 2 is a schematic sectional view of a cylinder having a support rail fitted thereto in a different fashion.

FIG. 2 illustrates another embodiment of the inventive attachment arrangement applied to a somewhat differently configured support rail, whereby the cylinder 1 with the dogging element 2 is turned 90 degrees compared with FIG. 1. As with the embodiment earlier described with reference to FIG. 1, the cylinder 1 is provided with grooves 3 and the support rail 12 with corresponding ridges 5, which are disposed on spacer strips 13 which define therebetween a space or channel 14. The bottom of the channel 14 in the support rail 12 has a V-shaped configuration, as shown in FIG. 2. The channel 14 accommodates two wedge-shaped strips 6", the oblique surfaces of which abut the bottom of the channel 14 and the straight surfaces of which abut a planar part 17 of the cylinder mantle. The spacer strips 13 have provided therein threaded holes 15 intended to receive screws by means of which the wedge-shaped strips 6" can be urged towards one another, therewith clamping the rail 12 in a manner corresponding to that described with reference to FIG. 1.

The FIG. 2 embodiment also includes a runner 16 which is guided by the rail 12 and which is connected to the dogging element 2.

Figure 3:
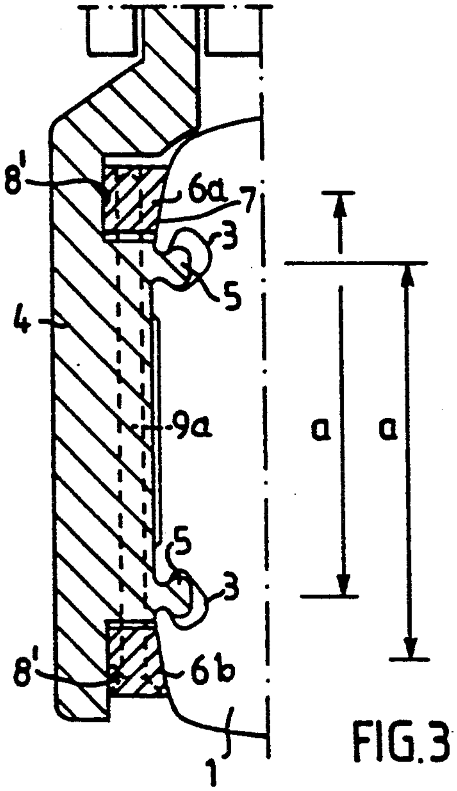
FIG. 3 is a part section of a further embodiment of the invention.

FIG. 3 is a part sectional view of a further embodiment, in which the wedge-shaped strips 6*a* and 6*b* have oblique surfaces. These oblique surfaces act against oblique surfaces 7 on the cylinder mantle and also against abutment surfaces 8' on the support rail 4 to be attached to the piston-cylinder device. In this case, through-passing holes are drilled in the support rail 4 and the upper wedge-shaped strip 6*a* is provided with threaded bores. The lower wedge-shaped strip 6*b* of this embodiment has through-passing bores. Long screws 9*a* extend from the lower wedge-shaped strip 6*b*, with the heads of the screws resting on said strip and mesh with screw threads on the upper wedge-shaped strip 6*a*. These screws 9*a* enable the wedge-shaped strips to be drawn together and therewith lock the support rail 4 to the piston-cylinder device in the same manner as that described with references to FIGS. 1 and 2.

Figure 4:
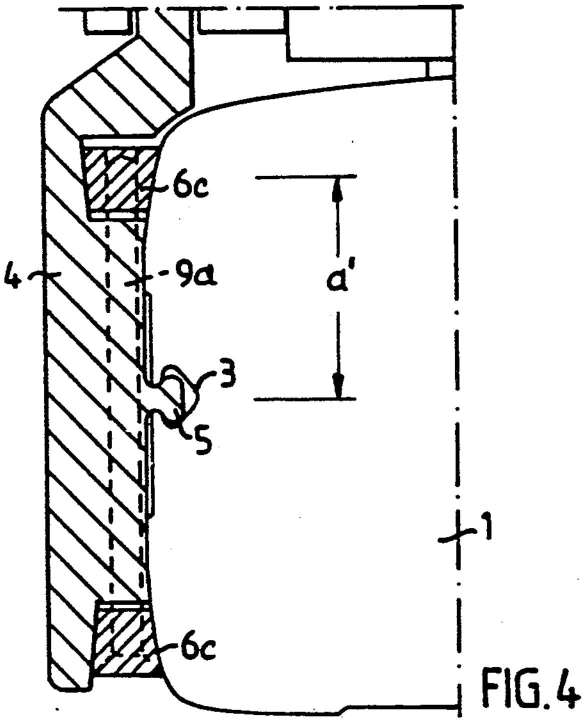
FIG. 4 illustrates a further alternative attachment arrangement.

Another embodiment of the inventive attachment arrangement is illustrated in FIG. 4. In the case of this embodiment, the cylinder 1 is provided solely with one groove 3 which extends along the side of the cylinder, and the support rail 4 with a corresponding ridge 5. The embodiment illustrated in FIG. 4 employs two wedge-shaped strips 6*c*. Each strip 6*c* has two oblique surfaces. For reasons of mechanical strength, this embodiment has a shorter lever arm a' and is therefore not as suitable as the embodiment described with reference to FIGS. 1-3 and presents problems in aligning the object attached thereto. This embodiment is technically feasible, however.

It will be understood that the inventive attachment arrangement can be applied with all types of control piston-cylinder devices, both with rodless piston-cylinder devices and with those which include a piston rod, and irrespective of whether the piston-cylinder devices are hydraulic, pneumatic or electrical devices, or cable devices or belt devices or magnetic piston devices. The undercut grooves 3 and the ridges 5 may also have other shapes than those illustrated and described. The wedge-shaped strips 6, 6', 6'', 6*a*, 6*b*, 6*c* may, having a length, for instance, corresponding to the object to be attached to the cylinder, or may have the form of short strips, for instance 20 cm, placed one after the other. It is also conceivable, of course, to provide short wedge-shaped strips for each screw, although such an arrangement would be more complicated from the aspect of assembly. It is pointed out that the embodiments illustrated in FIGS. 1 and 3 provide a very long and effective lever arm a which counteracts lateral moments of force on the support rail. The lever arm a' is relatively short in the case of the FIG. 2 and FIG. 4 embodiments.

I claim:

1. An apparatus for attaching an object (4) to a piston-cylinder control device (1), the cylinder of which has provided along at least one side thereof two undercut grooves (3) which extend parallel with one another and also with the cylinder axis, characterized in that the object (4) is provided with two parallel ridges (5) each in locking coaction with a respective one of said undercut grooves (3); in that said apparatus comprises at least one elongated device (6) of wedge-shaped cross-section which is separate from said object and which is located between the outer surface of the cylinder (1) and the object (4); and in that means (9) are provided for displacing the wedge-shaped device (6) in a direction transversal to the cylinder axis such as to bring the wedge-shaped device (6) into engagement with oblique surfaces, each of which is located on one of the cylinder (1) and the object (4) and which are separate from said undercut grooves (3), so as to fixate the object in a position parallel with the cylinder axis.

2. An apparatus according to claim 1, characterized in that the apparatus includes a plurality of wedge-shaped devices (6) which are located externally of said mutually coacting grooves (3) and ridges (5).

3. An apparatus according to claim 1, characterized in that the apparatus includes a plurality of wedge-shaped devices (6) which are located inwardly of said coacting grooves (3) and ridges (5).

4. An apparatus according to claim 1, characterized in that the means (9) for displacing the wedge-shaped device (6) is a screw.

5. An apparatus according to claim 1 characterized in that the apparatus includes two wedge-shaped devices (6) and the means for displacing the wedge-shaped devices (6) are screws (9) which act between the two wedge-shaped devices (6) in a manner to pull said devices towards one another.

6. An apparatus according to claim 2, characterized in that the means (9) for displacing the wedge-shaped devices are screws.

7. An apparatus according to claim 2, characterized in that the apparatus includes two wedge-shaped devices (6) and the means for displacing the wedge-shaped devices (6) are screws (9) which act between the two wedge-shaped devices (6) in a manner to pull said devices towards one another.

8. An apparatus according to claim 3, characterized in that the means (9) for displacing the wedge-shaped devices (6) are screws.

9. An apparatus for attaching an object (4) along at least one side of a piston-cylinder control device (1), the cylinder of which is provided with an undercut groove (3) which extends parallel with the cylinder axis, characterized in that the object (4) is provided with a key (5) in locking coaction with the undercut groove (3); in that said apparatus comprises a wedge-shaped device (6) arranged between the outer surface of the cylinder (1) and the object (4) on either side of the undercut groove (3) and the key (5); and in that means (9) are provided for moving the wedge-shaped device (6) in a direction transversely to the cylinder axis so that said device (6), 15 in engagement with oblique surfaces on one of the cylinder (1) and the object (4), will fixate said object in a position in which said object is parallel with the cylinder axis.

10. An apparatus according to claim 9, characterised in that the means (9) for moving the wedge-shaped device (6) is a screw.

11. An apparatus according to claim 9, characterized in that the apparatus includes two wedge-shaped devices (6) and the means for moving the two wedge-shaped devices (6) are screws (9) which act between the two wedge-shaped devices in a manner to pull said devices towards one another.

12. An apparatus according to claim 10, characterized in that the apparatus includes two wedge-shaped devices (6) and the means for moving the wedge-shaped devices (6) are screws which act between the two wedge-shaped devices in a manner to pull said devices towards one another.

13. A pressure fluid cylinder device comprising:

a piston-cylinder control apparatus including a piston and a cylinder, the cylinder of which has provided along at least one side thereof two undercut grooves which extend parallel with one another and also with the cylinder axis;

a dogging element attached to said piston for movement therewith longitudinally of said cylinder, said dogging element extending transversely out of said cylinder;

a runner attached with said dogging element;

two rails on two sides of said cylinder for supporting said runner, at least one of said rails having provided along one side thereof two parallel hooked ridges each in locking co-action with a respective one of said undercut grooves, and said one of said rails having two parallel abutment surfaces;

two elongated clamping strips of wedge-shaped cross-section for said one side of said rail, said strips being located between the outer surface of said cylinder and said abutment surfaces of said rail; and at least one screw for displacing said clamping strips in a direction transverse to the cylinder such as to bring the clamping strips into positive engagement with the outer surface of said cylinder and said abutment surfaces of said rail and therewith provide fixation of one rail in a position parallel with the cylinder.

14. A device according to claim 13, characterized in that the respective wedge-shaped strips are located externally of said mutually co-acting grooves and ridges.

15. A device according to claim 13, characterized in that the respective wedge-shaped strips are located inwardly of said co-acting grooves and ridges.

16. A device according to claim 13, characterized in that the device includes a plurality of screws which act between the two wedge-shaped strips in a manner to pull said strips toward one another.

17. An attachment arrangement for attaching a rail (4) along at least one side of a piston-cylinder control device (1), the cylinder of which is provided with an undercut groove (3) which extends parallel with the cylinder axis whereby the rail (4) is provided with a ridge (5) in locking co-action with the undercut groove (3); whereby an elongated strip (6) of wedge-shaped cross-section is arranged between the outer surface of the cylinder (1) and the rail (4) on either side of the groove (3) and the ridge (5); and whereby a screw (9) is provided for moving the wedge-shaped strip (6) in a direction transversely to the cylinder axis so that said strip (6), in engagement with oblique surfaces (7) on one of the cylinder (1) and the rail (4), will fixate said rail in a position in which said rail is parallel with the cylinder axis.

18. An attachment arrangement according to claim 17, characterized in that the attachment arrangement includes a plurality of wedge-shaped strips (6) and a plurality of screws (9), said screws act in a manner to push said strips toward one another.

* * * * *

UNITED STATES PATENT AND TRADEMARK OFFICE
CERTIFICATE OF CORRECTION

PATENT NO. : 5,138,935

DATED : August 18, 1992

INVENTOR(S) : Bo Granbom

It is certified that error appears in the above-identified patent and that said Letters Patent is hereby corrected as shown below:

Column 2, line 7, after "strips" insert -- 6 --.

Column 2, line 10, after "surface" insert -- 7 --.

Claim 9, Column 4, line 49, "15" should read -- is --.

Claim 9, Column 4, line 50, delete "," and insert -- and --.

Signed and Sealed this

Twelfth Day of October, 1993

Attest:

BRUCE LEHMAN

*Attesting Officer*

*Commissioner of Patents and Trademarks*